3,067,179
Patented Dec. 4, 1962

3,067,179
UNSATURATED POLYESTER RESIN FROM CERTAIN BENZENE TRICARBOXYLIC ACIDS, ALKENEDIOIC ACIDS AND GLYCOLS
Horst E. Frey, Chicago, Ill., assignor to Standard Oil Company, Chicago, Ill., a corporation of Indiana
No Drawing. Filed Apr. 29, 1960, Ser. No. 25,505
7 Claims. (Cl. 260—75)

This invention relates to unsaturated polyester resins of high hydroxyl content and also to copolymeric compositions of these resins and ethylenic or allylic monomers.

Unsaturated polyester resins are suitable for many applications wherein the resin is applied and then converted to the final desired solid, virtually insoluble material by means of a polymerization reaction. In the present time, unsaturated polyesters are particularly useful in the reinforced plastic industry wherein an unsaturated polyester resin and a styrene are copolymerized about a reinforcing material such as glass fiber.

Typical present day unsaturated polyester resins are prepared from isophthalic acid, ethylene or propylene glycol, and maleic anhydride. This resin is dissolved in a monomer, such as styrene, and the styrene solution applied to the glass fiber, usually by building up several layers (plies) of fiber to form the desired thickness of final article. The copolymerization is carried out in the presence of a peroxy catalyst.

An improved unsaturated polyester resin has been discovered, which resin consists essentially of: the reaction product of (a) benzene tricarboxylic acid selected from the class consisting essentially of trimellitic acid, trimellitic anhydride, trimesic acid, hemimellitic acid and hemimellitic anhydride, (b) alkenedioic acid selected from the class consisting of maleic acid, maleic anhydride, and fumaric acid, and (c) alkylene glycol containing 2–6 carbon atoms, all reacted under polyesterification condensation reaction conditions, said reactants being charged to the condensation zone, in a mole ratio basis of: benzene tricarboxylic acid to alkenedioic acid, 9:1–1:9; and glycol in an amount of about 1 mole per mole of alkenedioic acid and about 2–3 moles per mole of tricarboxylic acid.

In the main unsaturated polyester resin, the polycarboxylic acid is a benzene tricarboxylic acid containing no substituents other than carboxyl or anhydride groups. These acids are trimellitic acid, trimellitic anhydride, trimesic acid, hemimellitic acid and hemimellitic anhydride.

Maleic acid, maleic anhydride and fumaric acid are the alkenedioic acids providing the unsaturation in the resin product.

The dihydric alcohol utilized in the resin preparation is an alkylene glycol containing 2–6 carbon atoms. These may be either simple glycols or ether glycols. Examples of suitable glycols are ethylene glycol, butylene glycol, hexanediol, diethylene glycol, dipropylene glycol, and triethylene glycol. It is preferred to utilize glycols containing 2–4 carbon atoms.

The mole ratio of benzene tricarboxylic acid to alkenedioic acid charged is dependent upon the qualities desired in the particular final resin; this ratio may be from about 9:1–1:9 and preferably this mole ratio is about 2:1–1:2.

Sufficient glycol is charged to the reaction zone to produce a resin of high free-hydroxyl group content. This amount is the sum of about 1 mole of glycol per mole of alkenedioic acid charged and about 2–3 moles of glycol per mole of benzene tricarboxylic acid charged—more usually 2.5 moles of glycol per mole of benzene tricarboxylic acid charged.

The unsaturated polyester resin is prepared by introducing the reactants substantially simultaneously into the reaction zone. The reaction zone is provided, in the normal fashion, with a reflux condenser provided with a water trap-out. This permits returning glycol to the reaction zone and discard of the water produced in the polyesterification condensation reaction. The condensation reaction is carried out at elevated temperatures normal for this type of reaction, for example, 400–550° F. The particular temperature is dependent upon the particular set of reactants.

It is to be understood that the polyesterification condensation reaction follows very much the normal procedure for these types of reactions.

An improvement in properties of the final resin along with the significant improvement in ease of carrying out the final steps of the condensation reaction is obtained by modification of the conventional procedure for condensation. It has been discovered that the addition of a small amount of an alkanol to the reaction vessel at late stages of the resin cook makes it very much easier to control the cooking to the desired acid number and the avoidance of gelation when the usage of glycol per mole of tricarboxylic acid is in the region of 2–2.5. The alkanols containing 2–13 carbon atoms and preferably 4–8 carbon atoms are suitable for this purpose. By way of example, these alkanols include: methanol, isopropanol, n-butanol, hexanol, 2-ethylhexanol, and tridecanol. In general, the amount of alkanol is related to the amount of tricarboxylic acid charged. The more tricarboxylic acid charged the greater the amount of alkanol added in the final step of the cook. In general, the alkanol is added in an amount from a minimum of about 0.1 to a maximum of 0.5 mole per mole of tricarboxylic acid charged. It is to be understood that the type of alkanol and the type of resin reactants will have a bearing on the amount of alkanol used. It is further to be understood that the use of these small amounts of alkanol at the end of the reaction is not an essential feature of the method of preparation of the basic resin of the invention.

The unsaturated polyester resin may be recovered from the reaction zone and utilized as a molding powder. Or the recovered resin may be, in a separate operation, dissolved in ethylenic or allylic monomer such as styrene and utilized for copolymerization. It is more usual to add the monomer to the hot resin in the reaction zone and thereby obtain the solution immediately. Herein the ethylenic or allylic monomer is intended to include styrene itself, alpha methyl styrene, the various dimethyl styrenes, divinyl benzene, trivinyl benzene, ethyl styrene, and diethyl styrene; or any type of acrylic or methacrylic monomer; or allylic monomer such as diallylphthalate, diallylisophthalate or triallylcyanurate.

In the preparation of the monomer solution, the resin is cooled to a temperature on the order of 200–300° F. as determined by viscosity of the resin and viscosity of the resin solution. Normally polymerization inhibitors such as hydroquinone are added in order to avoid copolymerization during the solution preparation and during storage thereafter.

Illustrations

For purpose of illustration, the apparatus and general procedure typically used in the preparation of unsaturated polyesters of the invention and conventional unsaturated polyester resins are described in detail herein below. It is to be understood that this is a typical procedure and is not limiting of the scope and procedures which may be utilized in the preparation of the resins of the invention.

*Apparatus.*—In the laboratory, it is preferred to use 1,000 ml. round bottom flasks fitted with a Teflon stirrer through a ground glass neck, a bulb type reflux condenser with four of the five bulbs packed with glass beads. Steam is passed through this reflux condenser to permit passage of water or azeotrope vapor. On the top of this condenser is mounted a Dean-Stark type water trap and on top of same, is a water-cooled reflux condenser. Also connected with the flask is a nitrogen inlet and thermometer.

*General procedure.*—(In the industry a distinction is made between one-stage and two-stage cooks. In case of the former, all ingredients are present from the beginning. In the case of a two-stage cook, the aromatic acid portion and all of the glycol are cooked first to a low acid number. Then the maleic anhydride or fumaric acid is added and cooking is continued. The observation has been made that two-stage cooks often result in a lower viscosity of the stryenated resin.) For convenience and uniformity of procedure, the one-stage method has been used.

Ingredients are placed in the flask and the mixture is carefully heated so that the temperature rises above 250° F. within approximately 30 minutes. Mechanical stirring at constant speed is then possible with most compounds. Strong agitation with constant splashing cuts down the cook time several hours with both isophthalic and trimellitic cooks. For both type cooks the following temperatures were used: first hour 375° F., second and third hour 400° F., fourth and fifth hour 425° F., then increase to 450° F., hold there for ten minutes and then drop heating mantle. At the same time the nitrogen stream is increased. After 15 minutes or as soon as the temperature is below 375° F., the top water cooled condenser is removed to facilitate escape of mixed vapors. At about 320° F., stirring is interrupted and a sample is taken for acid number determination. If the desired acid number (below 40 but preferably below 30) has not been reached, cooking is continued at 425° F.

If the acid number is acceptable, the reflux condenser is removed at this point and stirring is continued until the lowest temperature has been reached where stirring is still possible. That is usually above 200° F. and with increasing amounts of trimellitic anhydride, approaches 300° F. Hydroquinone free radical reaction inhibitor (0.01%) is then added and styrene monomer is poured into the flask. Speed of agitation, rate of adding the liquid monomer and careful observation of the temperature are important. Once a clear and homogeneous solution is obtained, agitation should be continued slowly and the entire mixture cooled below 200° F. Further addition of a few crystals of hydroquinone at this point proved to be a good insurance against late gels.

Resins were prepared from the following formulations according to the above procedure—either normal or modified as required by the formulation, where all amounts are moles.

|  | 1 | 2 | 3 | 4 |
|---|---|---|---|---|
| Trimellitic Anhydride | 1.0 | 1.0 | 1.0 | 1.0 |
| Maleic Anhydride | 1.0 | 1.0 | 1.0 | 1.0 |
| Propylene Glycol | 3.0 | 3.0 | 3.5 | |
| 2-ethylexanol | | 0.1 | 0.1 | |
| Butylene Glcyol | | | | 4.0 |

Formulation 5: Trimellitic anhydride, 1.0; maleic anhydride, 1.0; ethylene glycol, 1.75; diethylene glycol, 1.75; and 2-ethylhexanol, 0.10. All these resins possess high hydroxyl numbers. Not only can they be used as such but also lend themselves to reaction with other compounds to produce resins of unique properties.

Castings

Sheets of clear resin were prepared by a casting procedure, the casting procedure affording ⅛″ thick plates. These clear plates were sawed into boards suitable for testing according to ASTM D–790–58T (flexural strength and modulus); ASTM D–648–56 (deflection temperature).

The mold was made of mirror finished brass sheets maintained at a clearance of ⅛″ by means of rubber gaskets. The two sheets were held together by spring clamps. The resin or solution is poured into the mold in such a manner that air pockets are avoided. The curing cycle is: 170° F. at the end of the first hour; maintained at 170° F. for one hour; heated to 250° F., which temperature is reached at the third hour; maintained at 250° F. for one hour; then turn off the heat and allow the mold to remain in the oven until room temperature is reached.

When a styrene solution is used to form the coating, 2% of a 50% suspension of benzoyl peroxide in tricresyl phosphate is added and the two stirred at moderate speed for about 5 minutes. (It is to be understood that any of the conventional peroxy type catalysts suitable for polymerizing styrene may be utilized in the copolymerization step.)

Laminating

No. 181 glass cloth finished with vinyl trichlorosilane is cut into pieces of appropriate size (e.g., 6 x 8 inches) and catalyzed styrenated polyester resin is poured onto each layer. Air is allowed to escape. Thorough wetting of the glass fabric is essential. Depending on the viscosity of the resin, it takes two to four hours to complete a twelve ply lay-up. The lay-up is placed between sheets of Mylar polyester film and placed in a press at 180°F. Contact pieces or a steel frame of exactly ⅛ of one inch thickness are being used so that the ultimate pressure will not actually be carried by the laminate. Slow and gradual closing of press platens is important to allow excess resin to flow out. The final weight ratio of glass to polyester resin is approximately 2:1 if the above materials and conditions are used. After 30 minutes press time at 180° F., the laminate is further cured in an over for two hours at 250° F.

The flexural strength, modulus and deflection temperature of laminates was determined according to the procedure set out for castings.

Thus having described the invention, what is claimed is:

1. An unsaturated resin product of the polyesterification reaction of, as the only reactants, (*a*) benzene tricarboxylic acidic member selected from the class consisting essentially of trimellitic acid, trimellitic anhydride, trimesic acid, hemimellitic acid and hemimellitic anhydride, (*b*) alkenedioic member selected from the class consisting of maleic acid, maleic anhydride, and fumaric member, and (*c*) alkylene glycol having 2–6 carbon atoms, in a mole ratio basis of: tricarboxylic acid member to alkenedioic member, 9:1–1:9; and glycol, about 1 mole per mole of alkenedioic member and 2–3 moles per mole of tricarboxylic acidic member, said resin product having an acid number below 40.

2. The resin of claim 1 wherein said glycol contains 2–4 carbon atoms.

3. The resin of claim 1 wherein said tricarboxylic acidic member to alkenedioic member ratio is about 2:1–1:2.

4. The resin of claim 1 wherein said alkenedioic member is maleic anhydride.

5. The resin of claim 1 wherein said glycol is propylene glycol.

6. The resin of claim 1 wherein said tricarboxylic acid member is trimellitic anhydride.

7. An unsaturated resin product of the polyesterification reaction of, as the only reactants, of (a) trimellitic anhydride, (b) alkenedioic acidic member selected from the class consisting of maleic acid, maleic anhydride, and fumaric acid, and (c) alkylene glycol having 2–4 carbon atoms, in a mole ratio basis of: trimellitic anhydride to alkenedioic member, 2:1–1:2; and glycol, about 1 mole per mole of alkenedioic member and about 2.5 moles per mole of trimellitic anhydride, said resin having an acid number below 30.

References Cited in the file of this patent

UNITED STATES PATENTS 2,562,878   Blair ------------------ Aug. 7, 1951

OTHER REFERENCES

"Trimellitic Anhydride," Amoco Chemicals Bulletin (1958), 32 pages, published Amoco Chemicals Corp., Chicago 80, Illinois.